(12) United States Patent
Robson et al.

(10) Patent No.: US 12,181,454 B2
(45) Date of Patent: Dec. 31, 2024

(54) SYSTEM FOR ELECTROSPRAY IONIZATION WITH INTEGRATED LC COLUMN AND ELECTROSPRAY EMITTER

(71) Applicant: DIONEX CORPORATION, Sunnyvale, CA (US)

(72) Inventors: Brandon Howard Robson, San Jose, CA (US); Xuefei Sun, San Jose, CA (US); Carla Marie Medlin, Santa Clara, CA (US); Shane Bechler, Menlo Park, CA (US)

(73) Assignee: Dionex Corporation, Sunnyvale, CA (US)

( * ) Notice: Subject to any disclaimer, the term of this patent is extended or adjusted under 35 U.S.C. 154(b) by 116 days.

(21) Appl. No.: 17/557,698

(22) Filed: Dec. 21, 2021

(65) Prior Publication Data
US 2023/0194482 A1    Jun. 22, 2023

(51) Int. Cl.
*G01N 30/00*    (2006.01)
*G01N 30/60*    (2006.01)
(Continued)

(52) U.S. Cl.
CPC ..... *G01N 30/7266* (2013.01); *G01N 30/6004* (2013.01); *G01N 30/6047* (2013.01); *H01J 49/0445* (2013.01); *H01J 49/167* (2013.01)

(58) Field of Classification Search
CPC .......... G01N 30/7266; G01N 30/6004; G01N 30/6047; H01J 49/0445; H01J 49/167
(Continued)

(56) References Cited

U.S. PATENT DOCUMENTS

| 4,283,280 A | * | 8/1981 | Brownlee | .............. | B01D 15/22 |
| | | | | | 210/198.2 |
| 6,875,348 B2 | | 4/2005 | Zare et al. | | |

(Continued)

FOREIGN PATENT DOCUMENTS

WO    WO-2006092043 A1 *    9/2006    ........ B01J 20/28004

OTHER PUBLICATIONS

Needham et al. "Peptide and Protein Bioanalysis Using Integrated Column-to-Source Technology for High-Flow Nanospray" Protein Analysis Using Mass Spectrometry: Accelerating Protein Biotherapeutics From Lab to Patient, Chapter 5, 2017, pp. 45-54.

(Continued)

*Primary Examiner* — Michael Maskell

(57) ABSTRACT

An integrated system for liquid separation and electrospray ionization includes an emitter-enabled capillary column including an emitter portion and a column portion; and a retractable protective sleeve for covering and/or supporting the emitter portion along at least a portion of its axis. The protective sleeve is mounted around the emitter-enabled capillary column. The retractable protective sleeve is moveable to an extended position wherein a tip of the emitter portion is covered by the protective sleeve. A resilient member is provided to bias the protective sleeve towards the extended position. The protective sleeve is enclosed and moveable within an outer electrically conductive sheath adapted for insertion within a holder having a high-voltage contact point. The sheath is adapted to contact the high-voltage contact point and provide an electrical connection to enable the emitter-enabled capillary column to receive a high voltage. The sheath has a recess to receive the high-voltage contact point.

12 Claims, 6 Drawing Sheets

(51) Int. Cl.
    *G01N 30/72*      (2006.01)
    *H01J 49/04*      (2006.01)
    *H01J 49/16*      (2006.01)
(58) Field of Classification Search
    USPC .................................. 250/281, 282, 288
    See application file for complete search history.

(56) References Cited

U.S. PATENT DOCUMENTS

| | | | |
|---|---|---|---|
| 9,153,426 B2 * | 10/2015 | Cichon, Jr. | ............. B05B 15/16 |
| 9,459,240 B2 | 10/2016 | Vorm | |
| 10,953,532 B2 | 3/2021 | Sunabe et al. | |
| 11,016,068 B2 | 5/2021 | Robson et al. | |
| 2014/0047905 A1 | 2/2014 | Tomany et al. | |
| 2015/0198571 A1 * | 7/2015 | Vorm | .................... H01J 49/165 |
| | | | 73/61.55 |
| 2020/0363380 A1 * | 11/2020 | Robson | .............. G01N 30/7266 |

OTHER PUBLICATIONS

Amirkahni et al. "Comparison Between Different Sheathless Electrospray Emitter Configurations Regarding the Performance of Nanoscale Liquid Chromatography-time-of-flight Mass Spectrometry Analysis" Journal of Chromatography, No. 1033, Jan. 29, 2004, pp. 257-266.

Heemskerk et al. "Ultra-Low Flow Electrospray Ionization-Mass Spectrometry for Improved Ionization Efficiency in Phosphoproteomics" Analytical Chemistry, 2012, pp. 4552-4559.

\* cited by examiner

SYSTEM FOR ELECTROSPRAY IONIZATION WITH INTEGRATED LC COLUMN AND ELECTROSPRAY EMITTER

FIELD

The present disclosure generally relates to the field of liquid chromatography including a system for electrospray ionization with integrated liquid chromatography (LC) column and electrospray emitter.

INTRODUCTION

Proteomics, being the study of protein structure and function, is a research focus for decades to come as it can allow one to elucidate the fundamentals of life and the molecular basis of health and disease. Analysis of complex protein mixtures usually involves two steps: molecular separation and identification/characterization. In the context of bottom-up proteomics experiments, proteins are subject to proteolytic digestion to break down into fragments of peptides which are then separated, usually with liquid chromatography (LC), before being introduced into an ion source of a mass spectrometer. Typically, the ion source for proteomics experiments implements electrospray ionization (ESI) to ionize the peptide to form ions that can be transported among components of a mass spectrometer.

While conventional HPLC columns (i.e. columns with fittings for connecting to conventional instruments) for use with nano-liter flow rates (also referred to as nano-LC) show superior performance, incorrect assembly of fittings and fluid connections often compromises the advantages associated with conventional nano-LC columns. In other words, incorrect connections of LC transfer tubing to the LC columns may result in leaks and consequently poor sensitivity and chromatographic separation. Also, incorrect connection of a conventional nano-electrospray emitter after the LC column may give rise to undesired dead-volumes which also leads to reduced sensitivity and poor separating power.

Thus, the integration of a complete LC-ESI system, wherein conventional LC columns and spray emitters are used, and wherein the end-user does not need to establish the correct fluid connections (correct assembling of fittings), is highly desirable.

The columns and transfer lines ordinarily used in liquid chromatography systems that employ flow rates less than 10 µL/minute most frequently have very narrow inner diameters as well as outer diameters. Consequently, such transfer lines and columns may be physically fragile. Thus, it is also highly desirable to provide some means of mechanical relief from strain, pressure, bends, twists etc. such that the thin tubing components are protected and become robust enough to withstand use in everyday laboratory work.

The commonly used interface between chromatography and mass spectrometry is made up by the electrospray ion-source. In the ion source, the eluate from the LC column is passed through an emitter (also termed a needle) that is held at an electric potential that usually differs by one or more kilovolts from an opposing inlet orifice of the mass spectrometer. This enables the eluate, and subsequently the analytes, to adopt electric charges (i.e. become ionized) such that the ionized analytes may be analyzed in the mass spectrometer. The physical characteristics of a LC column and an ESI emitter affect analytical performance. For example, stationary phase chemistry, stationary phase particle size, diameter, length, and post-column dead volume of the LC column influence separation efficiency of chromatography. For ESI performance using non-conductive emitters, solution resistances cause a voltage drop that reduces the magnitude of the voltage applied to the tip of the emitter, affecting the formation of ions.

The high electric potential differences present a safety hazard if the charged areas can be touched by the operator. Thus, it is highly desirable to efficiently shield as many components as possible that are at the elevated potential. The electrospray emitter is a thin fragile component that is potentially easy to damage if not handled carefully and moreover is sharp such that injury can be caused by it. It is therefore desirable to reduce the risk of damage to the electrospray emitter and/or injury by exposure to it.

SUMMARY

In a first aspect, an integrated system for liquid separation and electrospray ionization can include an emitter-enabled capillary column including an emitter portion and a column portion and a retractable protective sleeve for covering and/or supporting the emitter portion along at least a portion of its axis. The protective sleeve can be slidably mounted around the emitter-enabled capillary column. The retractable protective sleeve can be moveable to an extended position wherein a tip of the emitter portion is covered by the protective sleeve. A resilient member can be provided to bias the protective sleeve towards the extended position wherein it covers the tip of the emitter portion. The protective sleeve can be enclosed and moveable within an outer electrically conductive sheath adapted for insertion within a holder having a high-voltage contact point. The electrically conductive sheath can be adapted to contact the high-voltage contact point and provide an electrical connection to enable the emitter-enabled capillary column to receive a high voltage. The electrically conductive sheath can have a recess to receive the high-voltage contact point.

In various embodiments of the first aspect, the retractable protective sleeve can be moveable to a retracted position wherein a tip of the emitter-enabled capillary column is uncovered.

In various embodiments of the first aspect, the emitter-enabled capillary column can be embedded in a plastic material.

In various embodiments of the first aspect, the stationary phase can be held in place by a porous matrix in the emitter tip.

In various embodiments of the first aspect, the emitter-enabled capillary column can be a liquid chromatography (LC) column.

In various embodiments of the first aspect, the emitter-enabled capillary column can be coiled in a loop.

In various embodiments of the first aspect, the electrospray emitter can include a fused silica capillary, a metal capillary, a ceramic capillary, or a glass capillary.

In various embodiments of the first aspect, the high-voltage contact point can include an electrically conductive ball. In particular embodiments, the electrically conductive ball can fit in the recess in the outer surface of the electrically conductive sheath, and wherein the recess is a groove.

In various embodiments of the first aspect, the electrically conductive sheath can be electrically connected to an electrically conductive body. In particular embodiments, the electrically conductive body can be connected to an electrically conductive cap or union wherein the electrically conductive cap or union can be in direct contact with the eluent moving through the emitter-enabled capillary column.

In various embodiments of the first aspect, the holder is fixed on a mass spectrometer.

DRAWINGS

For a more complete understanding of the principles disclosed herein, and the advantages thereof, reference is now made to the following descriptions taken in conjunction with the accompanying drawings, in which.

Figure 1A:
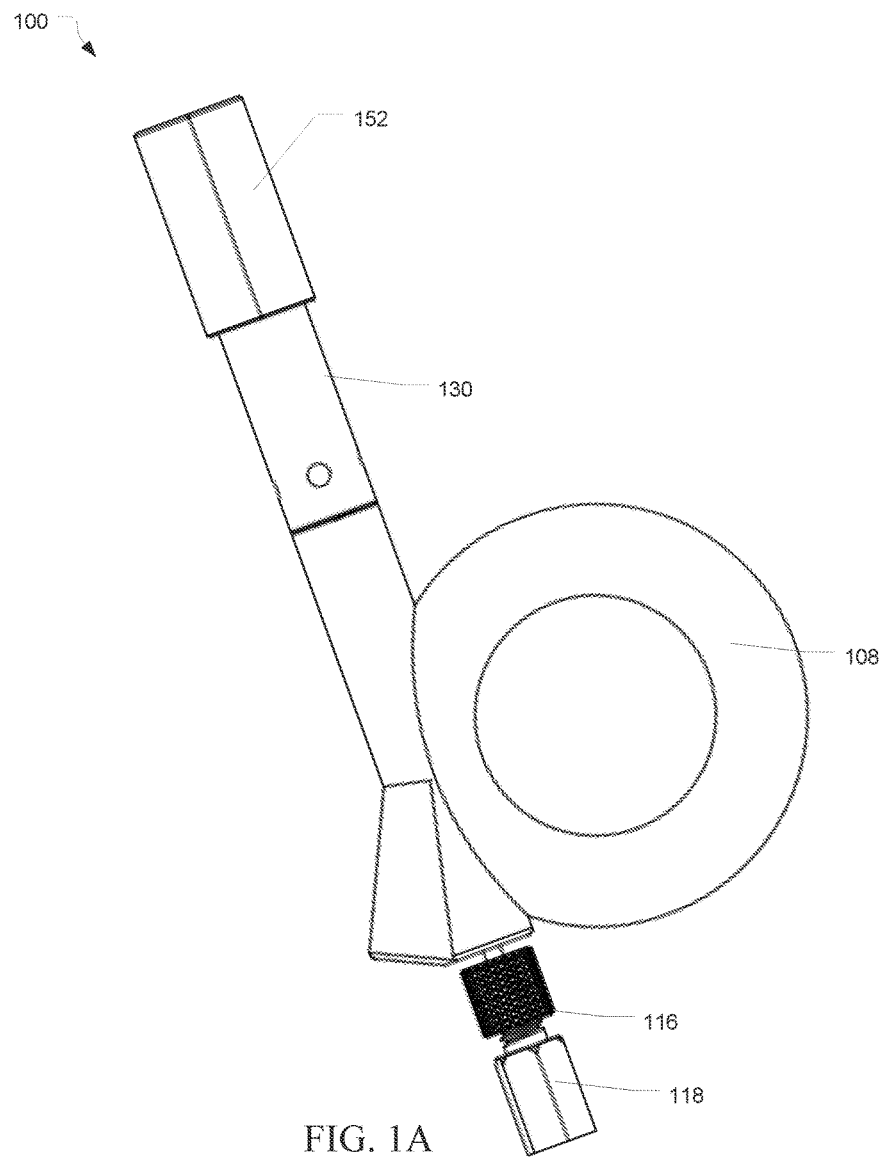
FIGS. 1A and 1B are external views of an integrated systems for electrospray ionization with an integrated LC column and electrospray emitter, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of a system for electrospray ionization with integrated liquid chromatography (LC) column and electrospray emitter are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

One technique to improve the analytical performance of the LC column and the ESI emitter is to combine the functionality of the emitter with the LC column into a single component, also referred to as a "packed-tip" design or an emitter-enabled capillary column. That is, the LC column can include an end that is pulled to a tip to implement the emitter, resulting in a single structure forming the LC column and the emitter. Due to the integration of the emitter with the LC column in a single structure, the post-column dead volume (i.e., the volume after the LC column and before a detector) is reduced, thereby reducing post-column peak broadening. This results in an increase, or ideal state, in the chromatographic performance.

Figure 2A:
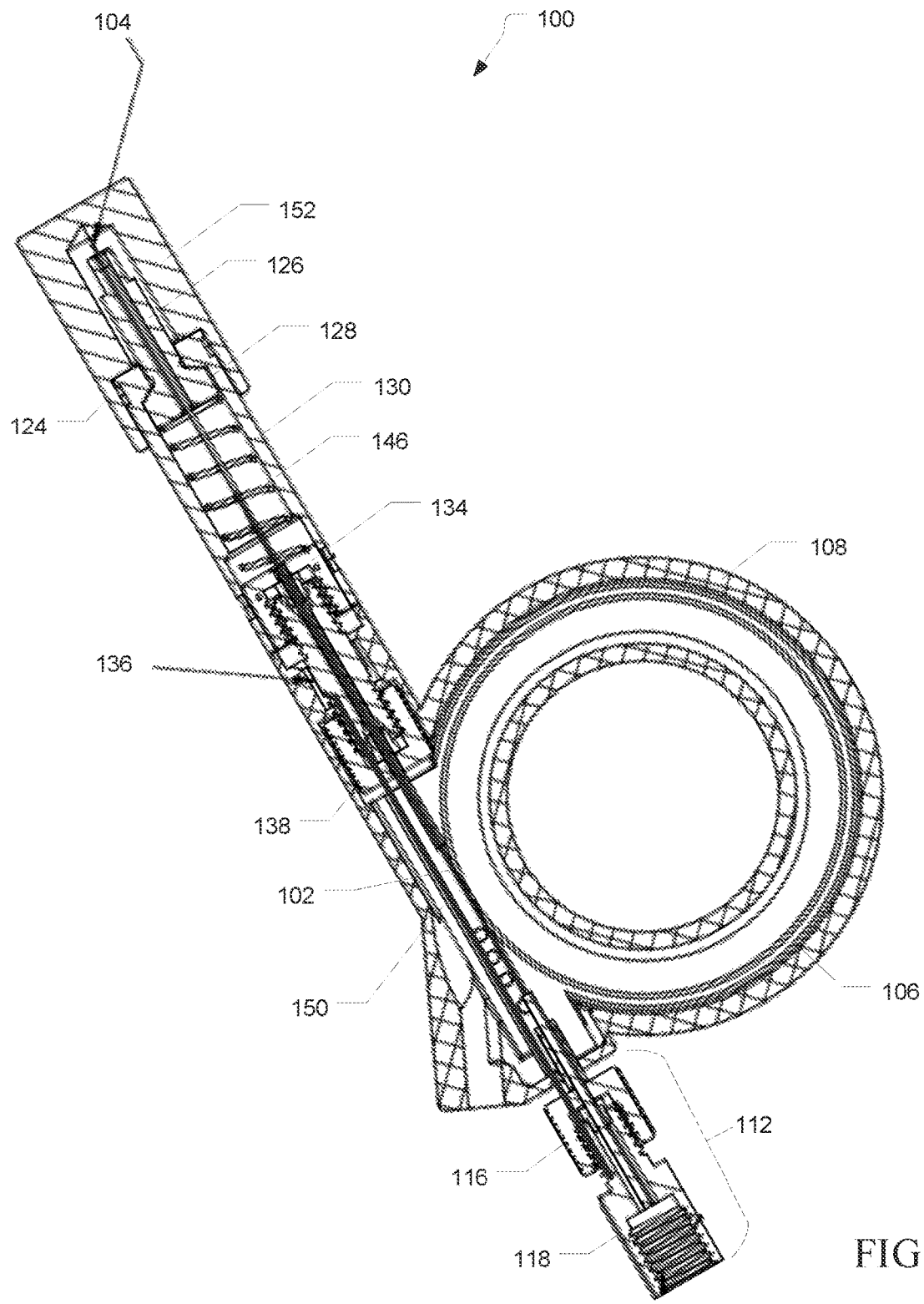
FIGS. 2A and 2B are cross-section views of the integrated systems of FIGS. 1A and 1B respectively, in accordance with various embodiments.
Figure 3A:
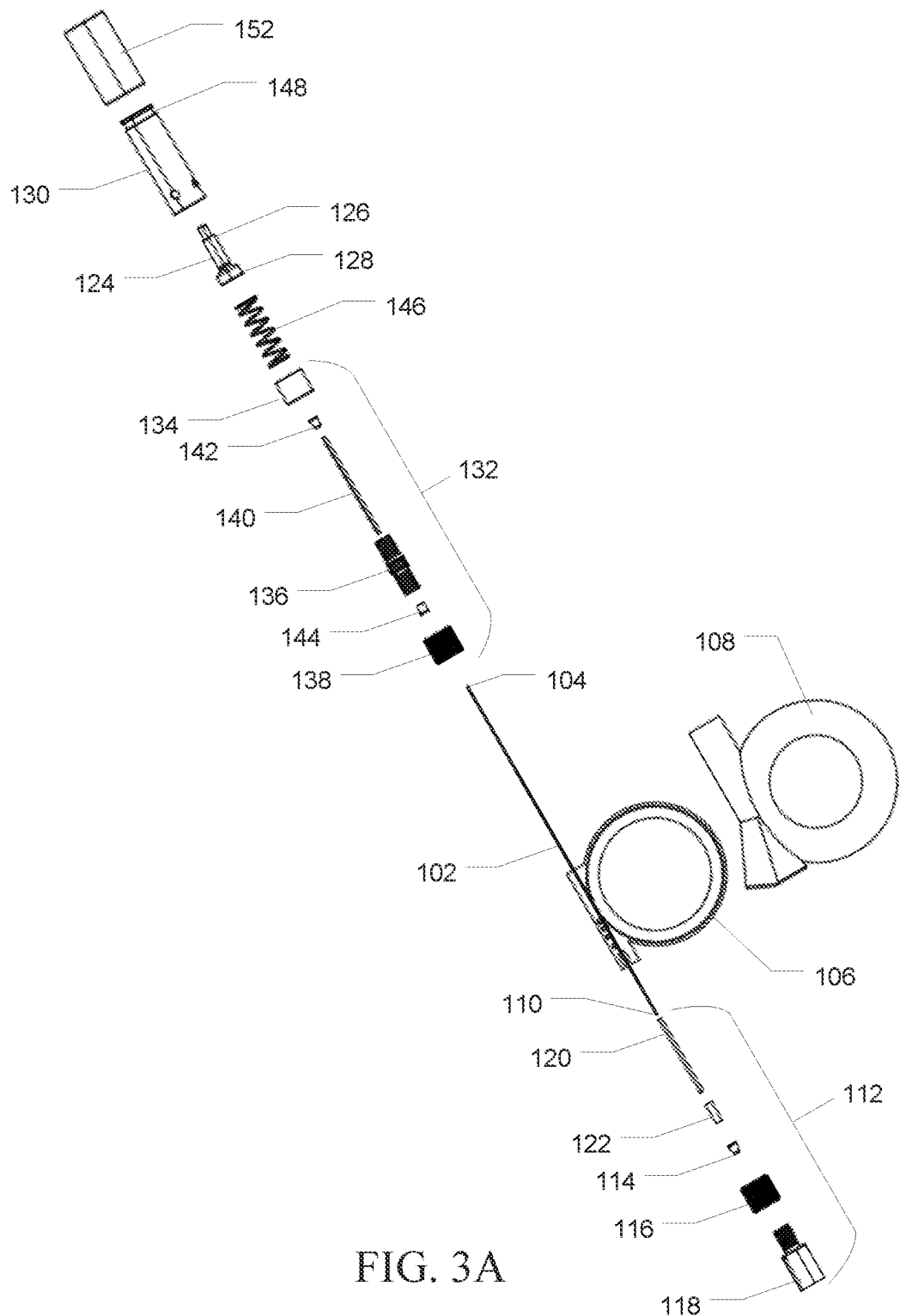
FIGS. 3A and 3B are exploded views of the integrated systems of FIGS. 1A and 1B respectively, in accordance with various embodiments.

Disclosed is a system to incorporates a capillary high-pressure liquid chromatography (HPLC) column with one end drawn to an electro spray ionization (ESI) tip integrated into the Easy Spray column format. The Easy Spray column format includes a retractable protective sleeve around the emitter tip, a temperature control PCB board, and an inlet frit on the capillary column to prevent the loss of media from the column FIG. 1A shows an external view of an integrated system 100, FIG. 2A shows a cross section view of the integrated system 100, and FIG. 3A shows an exploded view of the integrated system 100. Integrated system 100 comprising an emitter-enabled capillary column 102 with a distal end 104 pulled to a tip to function as an electrospray emitter. The emitter-enabled capillary column 102 includes a column portion and an emitter portion. Preferably, the column portion is an LC column, e.g. HPLC column. The LC column may be used with various flow rates, e.g. down to as low as nano-LC flow rates, i.e. 100 nL/min or less.

The column portion of the emitter-enabled capillary column 102 is coiled into a loop 106 comprising multiple column windings to increase the separation length. This enables space saving since it allows a column to take up less space than if it were laid straight and it permits different column lengths to be used in the same design of integrated system, i.e. by changing the number of windings in the coil. Coiling the column further makes the column compact and able to fit into a small volume that may more easily be temperature controlled by a heating element than if it were laid straight and would occupy an elongated, typically long, space.

The emitter portion includes an electrospray emitter. The electrospray emitter can include an electrically conductive capillary, such as a metal capillary or a glass capillary, e.g. glass coated with electrically conductive material. However, glass capillaries that are not conductive or coated may be used.

In various embodiments, the distal end 104 with integrated emitter tip can include a porous matrix. The porous matrix can reduce the void volume of the tip. Additionally, the porous matrix can provide a defined end to the column portion to ensure consistent packing of column material.

Figure 1B:
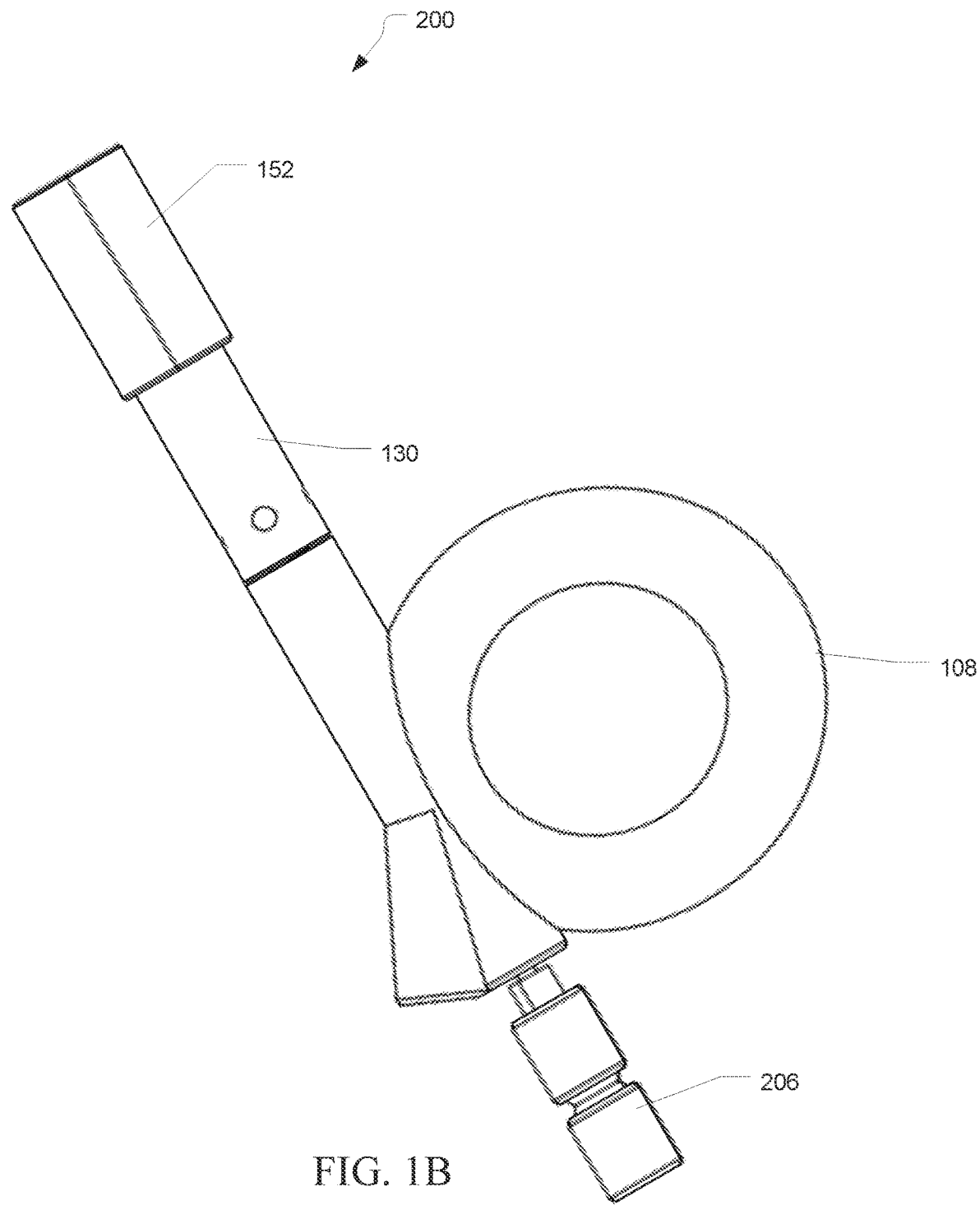
Figure 2B:
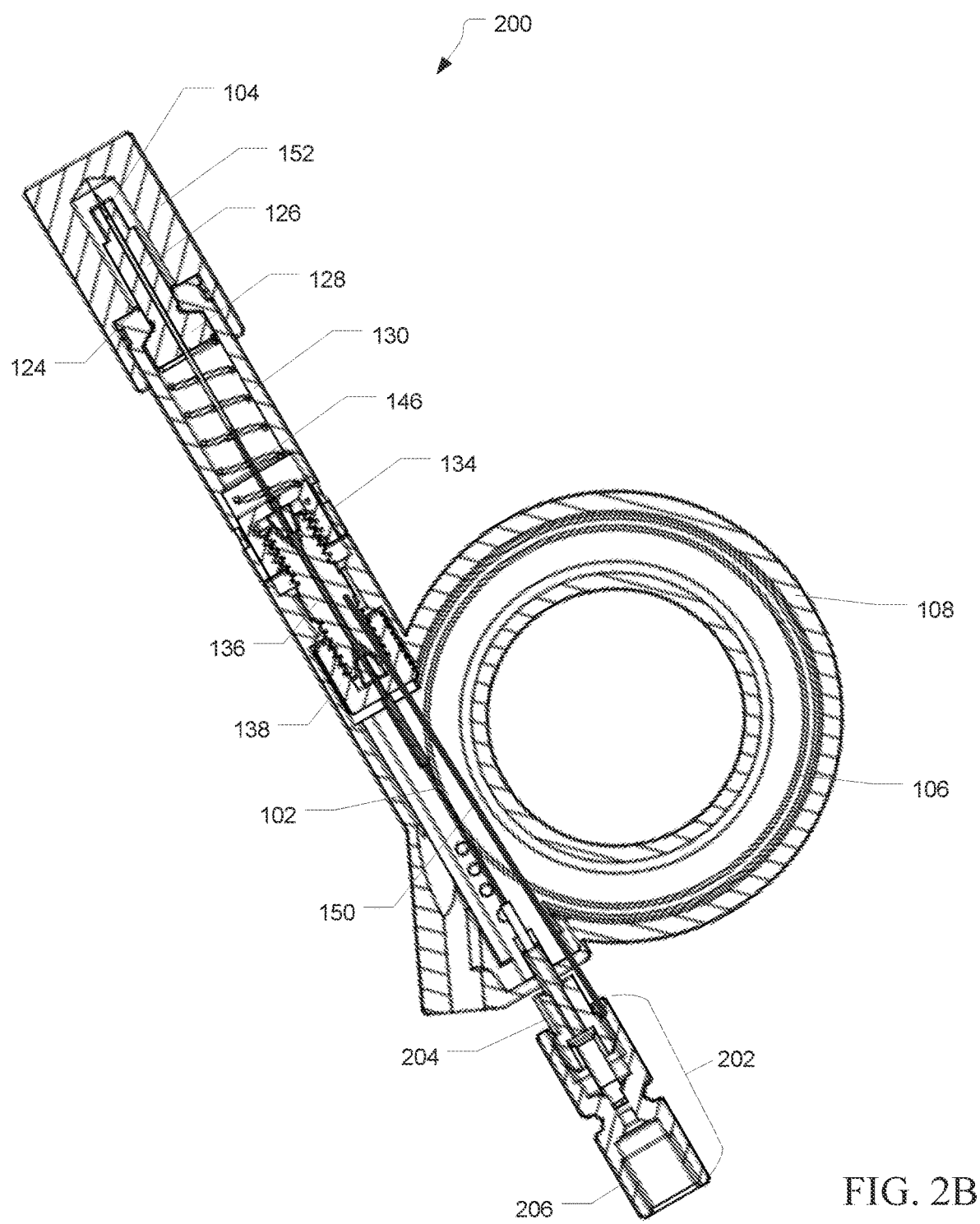
Figure 3B:
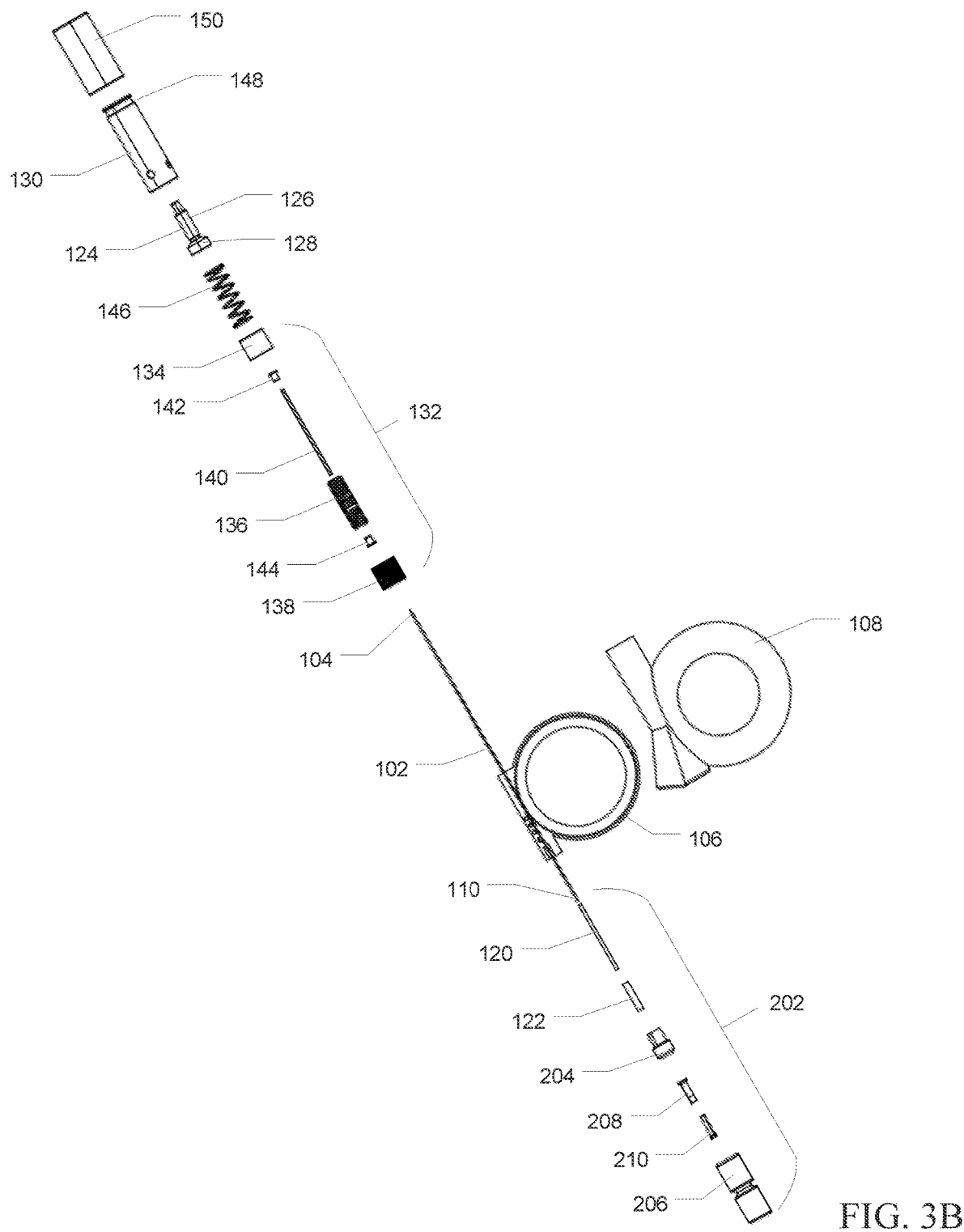

The emitter-enabled capillary column 102 is embedded in a molding part 108. The molding part 108 comprises a plastic material, for example, a thermoplastic material, for example, polyamide and polyurethane based MacroMelt™. Suitable methods to embed the assembly are described in the applicant's U.S. Pat. No. 9,302,415. A proximal end 110 of the emitter-enabled capillary column 102 is provided with fitting 112, e.g. for connection to an injector or other HPLC components. In various embodiments, the fitting 112 can include a ferrule 114, a nut 116, and cap 118. In other embodiments, the fitting 112 can include a plug type end fitting 202 with cap screw 204 and an external union with small internal diameter 206, as shown in FIGS. 1B, 2B, and 3B. The plug type end fitting 202 can include a conductive sleeve 208 and non-conductive sleeve 210. Additionally, one or more sleeves 120 and 122 can be provided to protect the emitter-enabled capillary column 102 and form a seal with other HPLC components at the fitting 112. The molding 108 provides rigidity to the system, as well as provides a shield against a user disassembling or damaging, intentionally or by accident, the fittings, HPLC column and emitter.

A protective sleeve 124 of generally cylindrical form is slidably located on the distal end 104 of the emitter-enabled capillary column 102. The sleeve has a main body 126 and a base 128 of wider diameter than the main body. The protective sleeve 124 is desirably made of a rigid material, such as a metal or polymer material. In this way the rigidity of the sleeve can protect the fragile emitter portion of the emitter-enabled capillary column 102 that it covers. Mounted about the protective sleeve 124 is an electrically conductive sheath 130, e.g. made of metal. The conductive sheath 130 has an internal diameter such as to accommodate therein the protective sleeve 124 and permit the protective sleeve 124 to slidably move in a reciprocating manner inside the sheath as further described below.

The electrically conductive sheath 130 is supported at one end by a supporting structure 132. In various embodiments, the supporting structure includes a conductive nut 134, a metal body 136, and an additional nut 138. The emitter-enabled capillary column 102 can be threaded through a sleeve 140, such as a PEEK sleeve, and the sleeve 140 and the emitter-enabled capillary column 102 can be held in place relative to the supporting structure 132 with ferrules 142 and 144.

In some embodiments, the protective sleeve is fixed with respect to the emitter. However, the protective sleeve is most preferably retractable, i.e. with respect to the emitter tip of the emitter-enabled capillary column 102. Where the sleeve is retractable, this ensures that the emitter tip is exposed when in use and thereby the sleeve does not interfere, for example, with gas flows and equipotential lines around the emitter tip. Moreover, a retractable sleeve, when in use, does not block visibility of the emitter tip so one can readily monitor the spray. The protective sleeve is preferably slidably located on the emitter-enabled capillary column 102. The protective sleeve is preferably movable between an extended (or cover) position wherein it covers the emitter tip, and a retracted position wherein the emitter tip is exposed. When the emitter tip is exposed, it may be used for electrospray ionization. The emitter tip herein means the tip from which ions are produced when in use. The protective sleeve thus covers and supports the emitter-enabled capillary column 102 along at least a portion of its axis which includes the emitter tip.

A spring 146 is further provided inside the electrically conductive sheath 130, positioned in a space between the supporting structure 132 and the protective sleeve 124. The spring 146 acts upon the base of the protective sleeve to bias the protective sleeve 124 to force it out of the electrically conductive sheath 130. The length of the sleeve 124 and its extension out of the sheath is sufficient to cover the tip of the emitter-enabled capillary column 102 and act to protect it against damage. A part of the main body 126 of the protective sleeve 124 protrudes outside the sheath 130 and thereby covers the emitter. The extent of travel of the sleeve 124 out of the sheath 130 is restricted by a reduced internal diameter at the end of the sheath 130 that stops the wider diameter base 128 of the sleeve. If a force is applied to the sleeve 124 to push the sleeve backwards into the sheath 130, the spring 146 becomes compressed and the tip of the emitter becomes exposed and ready for use.

The spring is provided in contact with the protective sleeve to bias the sleeve towards its extended position. The spring is preferably in contact with the base of the protective sleeve. In this way, the spring, upon activation, is able to force the sleeve to cover the emitter tip when it is required to be protected. The spring also allows the sleeve to be retracted from the emitter tip when the integrated system is assembled with an instrument for mass spectrometric analysis. To enable this retraction, preferably the spring is forced into a compressed state, e.g. by pushing the sleeve towards the spring. The spring biases the sleeve to the extended position such that the sleeve adopts the extended or cover position when the sleeve does not have a sufficient force applied pushing it against the spring. The spring thereby enables the protective sleeve to cover the tip end of the emitter when the emitter is not required to be used such as when the integrated system is disassembled from an instrument for mass spectrometric analysis.

The protective sleeve is preferably enclosed within the electrically conductive sheath. The electrically conductive sheath 130 is preferably fixed in position in relation to the emitter-enabled capillary column 102. The protective sleeve is preferably capable of reciprocating motion within the electrically conductive sheath 130, thereby enabling the protective sleeve to be retractable with respect to the emitter-enabled capillary column 102. In such embodiments, the spring is also preferably provided inside the electrically conductive sheath 130 for providing a force against the sleeve, more preferably against the base of the sleeve, to bias the sleeve towards the extended position.

In embodiments where the protective sleeve is used in combination with the electrically conductive sheath, the spring is provided inside the electrically conductive sheath, whereby the spring, upon activation, is able to force the sleeve out of the electrically conductive sheath to cover the emitter. Thus, in certain preferred embodiments, the protective sleeve may be forced out as soon as the system is pulled out of a recipient holder, that is, the spring force is constantly acting so as to push the sleeve in an outwards direction thereby to cover the emitter tip.

The electrically conductive sheath 130 can be enclosed within a holder having a high-voltage contact point when the integrated system is in use. The holder can be a holder located on an instrument, e.g. for mass spectrometric analysis. The electrically conductive sheath 130 provides an electrical connection to enable the emitter to receive a high voltage. The sheath may provide an electrical connection to the emitter-enabled capillary column 102 either directly or via one or more intermediate electrically conductive bodies, e.g. the protective sleeve or the fitting. The electrically conductive sheath 130 has a recess in the form of a circumferential groove 148 in its outer surface for making an electrical contact with a high voltage contact, e.g. a contact ball. An electrical path between the high voltage contact and a junction within the fitting. The electrical path can include the electrically conductive sheath 130, the conductive nut 134, the metal body 136, a conductive wire 150, and cap 118 or union 206. In various embodiments, the nut 116 and additional nut 138 can be non-conductive and not included in the electrical path. In other embodiments, one or more of nuts 116 and 138 can be electrically conductive and form part of the electrical path. In various embodiments the cap screw 204 can be non-conductive and not included in the electrical path. In other embodiments, cap screw 204 can be electrically conductive and form part of the electrical path. The electrically conductive sheath 130 is electrically connected to the fitting 112 that connects the emitter-enabled capillary column 102 to the upstream components and the fitting 112 electrically contacts the electrically conductive liquid (eluent) at the point of entering the emitter-enabled capillary column 102, thereby enabling the transfer of charge from the high voltage contact point to the tip of the emitter.

The plastic molding 108 covers the integrated system with the electrically conductive sheath 118 mounted at the front end and the protruding sleeve 124 protecting the emitter distal end 104 of the emitter-enabled capillary column 102. It will be appreciated from the description that the whole integrated system is thus formed as a type of cartridge for use with an instrument, e.g. mass spectrometer. An emitter cap 152 can cover the electrically conductive sheath when not in use.

In order to meet the most relevant requirements in relation to the operation of the column, the integrated separation column may be equipped with one or more embedded components of: a heating and/or cooling element and a thermal sensor in close proximity or contact with the column and preferably embedded in the plastic material.

For optimum performance, channels for gas flow may also be embedded in the plastic material; the outlet of these channels being in close proximity with the apex (tip) of the emitter, whereby gas leaving the outlet assists in the desolvation of the spray cloud.

In order to facilitate identification of the integrated column, the embedded components may further comprise an identification tag, such as a radio frequency identification tag (RFID) embedded in the plastic material.

In manufacturing the integrated system of the present invention, plastifying the plastic material that is used for embedding the integrated system may be achieved in various ways, preferably by heating the plastic material beyond the softening temperature for bringing it in its softening range and making it soft. In a preferred embodiment the entire column and fittings are surrounded by the plastic material. The plastic material may be provided as a plastic molding part. The molding part may be a pre-formed part adapted to the shape of the integrated separation column and of the forming tool.

The forming of the molding part may be achieved by closing the forming tool and exerting pressure on the pre-formed part. Alternatively, this is achieved by closing the forming tool and heating the forming tool together with the plastic material.

The forming of the molded part may be achieved by injecting molten plastic material into a mold wherein the LC column with fittings and other related or required components are located and allowing the molten plastic to embed these parts and cool off and harden to become solid. Alternatively the molded part may be shaped by exerting pressure on the plastic material caused by the thermal expansion of the plastic material by heating the closed forming tool comprising the plastic material, alternatively by exerting pressure on the plastic material by closing the forming tool, or actively cooling down the plastic material and/or the forming tool. Still another alternative embodiment may be achieved by mixing chemicals that subsequently polymerize inside a mold thereby embedding the LC column with fittings and other related components such as the emitter.

The plastic material used in the method of the present invention may be thermoplastic material or thermosetting material. Preferably, the plastic material is at least one of: a thermoplastic material, polyetheretherketone (PEEK), one of a broad range of fluoropolymers, in particular perfluoroamines (PFA) or fluorinated ethylene-propylene copolymer (FEP), duroplastic material or compound, in particular polyimide, and liquid crystal polymers (LCP).

Preferably, the plastic materials of the present invention are thermoplastic hotmelts based on polyamide, such as those marketed under the tradename MacroMelt (Henkel Kommanditgesellschaft). These includes at least one room-temperature-flowable polymerizable compound in combination with a polymeric matrix present in an amount sufficient to render the composition non-flowable at temperatures of at least about 49° C. The polymerizable compound or composition may be selected from a wide group of materials including anaerobics, epoxies, acrylics, polyurethanes, olefinic compounds and combinations thereof. Anaerobic compositions are most desirable since they have unique applications in many threadlocking and sealant areas where the need for a non-flowable material exists. The polymeric matrix may be selected from polyamides, polyacrylamides, polyimides, polyhydroxyalkylacrylates and combinations thereof. In one desired embodiment of the present invention an anaerobic adhesive composition is provided which includes a polymerizable (meth) acrylate monomer, a polymerization initiator for the monomer, and a polymeric matrix material miscible or otherwise compatible with the monomer. The matrix material is present in an amount sufficient to render the composition non-flowable at temperatures of at least about 210° C. The polymeric matrix and polymerizable component readily form a stable mixture or combination without phase separation of component parts.

It is important to emphasize that preferred embodiments of the present invention are also directed to an integrated separation column comprising end fittings embedded in a plastic material, irrespective of the method used for the embedment in the plastic material. Also, in this general embodiment the integrated separation column may further comprise an electrospray emitter directly connected with the separation column through one of the end fittings. Moreover, as in the other embodiments of the present invention the plastic material is at least one of: a thermoplastic material, preferably based on polyamide and/or polyurethane, polyetheretherketone (PEEK), one of a broad range of fluoropolymers, in particular perfluoroamines (PFA) or fluorinated ethylene-propylene copolymer (FEP), duroplastic material or compound, in particular polyimide, liquid crystal polymers (LCP). Finally, the integrated separation column may in agreement with the other described embodiments of the present invention further comprise one or more of: an RFID-tag, heating/cooling elements and thermo sensor, a high-voltage contact point for the electrospray emitter, counter electrode(s) with a geometry that benefits definition of the field lines around the electrospray emitter, and channels for gas flow embedded in the plastic material.

Coupling with a laboratory apparatus, for example a mass spectrometer, becomes easier. Additionally, an exact and repeatable positioning process of the integrated column relatively to the frame can be guaranteed by molding the plastic material to a shape that provides a close or tight fit in a receiving holder on the laboratory apparatus. The ease and accuracy of the positioning may be further enhanced by use of shapes that by design help lock the two items into a given position (e.g. by way of convex/concave mating surfaces, magnets or spring loads). This also enables the exact positioning of the integrated column into a laboratory apparatus if the holder is positioned precisely in the laboratory apparatus.

In addition to shielding the column, emitter and fittings from disassembly (whether intentional or accidental), the plastic embedding also renders physical strength to some otherwise rather fragile components that are prone to be damaged through everyday usage in laboratory environments. Nano-LC columns are frequently and advantageously made from a piece of silica glass tubing where said tubing typically is 10 mm to 1000 mm long but has an outer diameter of around 300 µm and hence the tubing can easily break. Typically, such silica glass tubing has an outer polymer lining of a few micrometers thickness that renders some strength but the glass tubing is still easily broken. Similarly, the emitter is made from a very narrow piece of metal or glass tubing and can readily be damaged by contact with other items. The plastic embedding described herein makes the integrated column robust and durable such that they cannot readily break by accident. The protection of the column and emitter includes protection from physical strains, twists, bends as well as the pressure of the liquid inside the tubing whose thin walls are made several fold thicker by the plastic matrix being in direct (chemical) contact with the outer surface of the tubing.

The chromatographic retention times that are observed for the individual analytes are highly dependent on the temperature at which the separation takes place. Slight variation in temperature can lead to pronounced shifts in retention times and in order to obtain reproducible data, it is often sought to maintain stable ambient temperatures for the column. NanoLC columns—by virtue of their small diameters—can readily exchange heat with the surrounding air. This is however prevented by the plastic matrix which provides thermal insulation of the columns and therefore assists in maintaining stable column temperatures.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An integrated system for liquid separation and electrospray ionization, comprising:
   an emitter-enabled capillary column including a column having an end pulled to a tip to implement an emitter, such that an emitter portion and a column portion are integrated into a single structure, the column portion packed with a stationary phase column material, the emitter portion including a porous matrix;
   a fitting coupled to the emitter-enabled capillary column at an end opposite the tip; and
   a retractable protective sleeve for covering and/or supporting the emitter portion along at least a portion of its axis, the protective sleeve is slidably mounted around the emitter-enabled capillary column;
   wherein the retractable protective sleeve is moveable to an extended position wherein a tip of the emitter portion is covered by the protective sleeve, and wherein a resilient member is provided to bias the protective sleeve towards the extended position wherein it covers the tip of the emitter portion, the protective sleeve being enclosed and moveable within an outer electrically conductive sheath adapted for insertion within a holder having a high-voltage contact point, the electrically conductive sheath being adapted to contact the high-voltage contact point and provide an electrical connection to enable the emitter-enabled capillary column to receive a high voltage and wherein the electrically conductive sheath has a recess to receive the high-voltage contact point,
   wherein the electrically conductive sheath is in electrical contact with the fitting and the fitting electrically contacts an eluent at the point the eluent enters the emitter-enabled capillary column.

2. The integrated system of claim 1, wherein the retractable protective sleeve is moveable to a retracted position wherein a tip of the emitter-enabled capillary column is uncovered.

3. The integrated system according to claim 1, wherein the emitter-enabled capillary column is embedded in a plastic material.

4. The integrated system according to claim 1, wherein the stationary phase column material is held in place by the porous matrix in the emitter tip.

5. The integrated system according to claim 1, wherein the emitter-enabled capillary column is a liquid chromatography (LC) column.

6. The integrated system according to claim 1, wherein the emitter-enabled capillary column is coiled in a loop.

7. The integrated system according to claim 1, wherein the electrospray emitter comprises a fused silica capillary, a metal capillary, a ceramic capillary, or a glass capillary.

8. The integrated system according to claim 1, wherein the high-voltage contact point comprises an electrically conductive ball.

9. The integrated system according to claim 8, wherein the electrically conductive ball fits in the recess in the outer surface of the electrically conductive sheath, and wherein the recess is a groove.

10. The integrated system according to claim 1, wherein the electrically conductive sheath is electrically connected to an electrically conductive metal body.

11. The integrated system according to claim 10, wherein the electrically conductive body is connected to an electrically conductive cap or union wherein the electrically conductive cap or union is in direct contact with the eluent moving through the emitter-enabled capillary column.

12. The integrated system according to claim 1, wherein the holder is fixed on a mass spectrometer.

* * * * *